(12) United States Patent
Charpentier et al.

(10) Patent No.: US 11,171,687 B2
(45) Date of Patent: Nov. 9, 2021

(54) METHOD AND SYSTEM FOR OPERATING A COMMUNICATIONS DEVICE THAT COMMUNICATES VIA INDUCTIVE COUPLING

(71) Applicant: NXP B.V., Eindhoven (NL)

(72) Inventors: Steve Charpentier, Antibes (FR); Ulrich Andreas Muehlmann, Graz (AT); Stefan Mendel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/691,959

(22) Filed: Nov. 22, 2019

(65) Prior Publication Data

US 2020/0195305 A1 Jun. 18, 2020

(30) Foreign Application Priority Data

Dec. 14, 2018 (EP) ..................... 18306698

(51) Int. Cl.
*H04B 5/00* (2006.01)
*H04L 7/00* (2006.01)
*H04L 7/02* (2006.01)
*H04B 5/02* (2006.01)

(52) U.S. Cl.
CPC ......... *H04B 5/0031* (2013.01); *H04B 5/0093* (2013.01); *H04B 5/02* (2013.01)

(58) Field of Classification Search
None
See application file for complete search history.

(56) References Cited

U.S. PATENT DOCUMENTS

| 6,052,422 | A | * | 4/2000 | Lin | H04L 7/0331 375/355 |
| 7,184,729 | B2 | * | 2/2007 | Kluge | H03G 3/3052 455/115.1 |
| 7,614,564 | B2 | * | 11/2009 | Kari | G06K 7/0008 235/492 |
| 7,697,067 | B2 | * | 4/2010 | Lim | H04N 5/10 348/540 |
| 7,949,075 | B2 | * | 5/2011 | Brunsch | H04L 27/1563 375/340 |
| 8,265,198 | B2 | * | 9/2012 | Leutgeb | H04L 27/06 375/316 |

(Continued)

FOREIGN PATENT DOCUMENTS

| EP | 3107208 A1 | 12/2016 |
| GB | 2479888 A | 11/2011 |
| WO | WO-2015/032338 A1 | 3/2015 |

*Primary Examiner* — Tuan A Tran (57) ABSTRACT

Embodiments of methods and systems for operating a communications device that communicates via inductive coupling are described. In an embodiment, a method for operating a communications device that communicates via inductive coupling involves detecting a falling signal edge corresponding to a received signal at the communications device based on a falling signal edge threshold, detecting a rising signal edge corresponding to the received signal based on a rising signal edge threshold, where the rising signal edge threshold is independent from the falling signal edge threshold, and decoding the received signal based on the detected falling signal edge and the detected rising signal edge. Other embodiments are also described.

15 Claims, 6 Drawing Sheets

(56) References Cited

U.S. PATENT DOCUMENTS

| | | | |
|---|---|---|---|
| 8,275,085 B2* | 9/2012 | Yi | H04L 1/1867 |
| | | | 375/360 |
| 8,446,983 B2* | 5/2013 | Wang | H04L 27/06 |
| | | | 375/320 |
| 8,531,177 B2* | 9/2013 | Kihara | H03K 5/01 |
| | | | 324/76.39 |
| 8,653,868 B2* | 2/2014 | Yang | H03L 7/0802 |
| | | | 327/158 |
| 8,903,313 B2* | 12/2014 | Kang | H04L 25/066 |
| | | | 455/41.1 |
| 9,259,979 B2* | 2/2016 | Juzswik | B60C 23/0489 |
| 9,608,797 B2* | 3/2017 | Choke | H04L 27/06 |
| 9,942,029 B2* | 4/2018 | Choke | H04L 7/0041 |
| 9,948,451 B2* | 4/2018 | Choke | H04B 5/00 |
| 10,027,332 B1* | 7/2018 | Wang | H04L 7/0331 |
| 10,129,059 B2* | 11/2018 | Chakraborty | H04B 1/30 |
| 10,291,241 B2* | 5/2019 | Wang | H04L 7/033 |
| 10,404,448 B2* | 9/2019 | Bucci | H04L 27/08 |
| 10,601,576 B2* | 3/2020 | Bucci | H04L 7/0331 |
| 10,623,218 B2* | 4/2020 | Kune | H04L 27/261 |
| 10,637,673 B2* | 4/2020 | Brandt | H04B 7/15 |
| 2007/0126584 A1 | 6/2007 | Hyde et al. | |
| 2010/0189196 A1 | 7/2010 | Wang et al. | |
| 2014/0080412 A1 | 3/2014 | Kang et al. | |
| 2019/0342067 A1* | 11/2019 | Bucci | H04L 25/03006 |

\* cited by examiner

METHOD AND SYSTEM FOR OPERATING A COMMUNICATIONS DEVICE THAT COMMUNICATES VIA INDUCTIVE COUPLING

CROSS-REFERENCE TO RELATED APPLICATIONS

This application claims priority under 35 U.S.C. § 119 to European Patent Application No. 18306698.4, filed on Dec. 14, 2018, the contents of which are incorporated by reference herein.

BACKGROUND

Communications devices can communicate with each other via inductive coupling. For example, near field communications (NFC) is a wireless technology based on radio frequency identification (RFID) that uses magnetic field induction to communicate between electronic devices. NFC defines a wireless connection between two devices in close proximity to each other to exchange data between the two devices. For example, the data communications between a reader and a transponder typically are bi-directional and initiated by the reader, which generates a continuous magnetic field. RFID devices that utilize NFC typically can be configured for either passive load modulation (PLM) or active load modulation (ALM).

Communications devices that communicate with each other via inductive coupling (e.g., using induction type antennae such as loop antennae or any other suitable type of induction type antennae) typically operate based on a linear communications channel model. However, characteristics of communications channels between communications devices that communicate with each other via inductive coupling can vary over time because of impedance changes. For example, in "reader-mode" in which an NFC device behaves as a reader device, a signal that is received at the NFC device has a variety of possible shapes that depend on the different emitter structures, different antenna structures, and/or the physical environment and conditions. Under conditions in which characteristics of a communications channel vary over time, a received signal at an NFC device may have varying amplitudes (e.g., overshoots and undershoots) over time.

SUMMARY

Embodiments of methods and systems for operating a communications device that communicates via inductive coupling are described. In an embodiment, a method for operating a communications device that communicates via inductive coupling involves detecting a falling signal edge corresponding to a received signal at the communications device based on a falling signal edge threshold, detecting a rising signal edge corresponding to the received signal based on a rising signal edge threshold, where the rising signal edge threshold is independent from the falling signal edge threshold, and decoding the received signal based on the detected falling signal edge and the detected rising signal edge. Other embodiments are also described.

In an embodiment, detecting the falling signal edge corresponding to the received signal at the communications device based on the falling signal edge threshold involves comparing a negative peak signal amplitude corresponding to the received signal with the falling signal edge threshold and identifying the falling signal edge when the negative peak signal amplitude is greater than the falling signal edge threshold.

In an embodiment, the method further involves changing the falling signal edge threshold after the falling signal edge is detected.

In an embodiment, changing the falling signal edge threshold after the falling signal edge is detected involves changing the falling signal edge threshold based on a negative peak signal amplitude after the falling signal edge is detected.

In an embodiment, detecting the rising signal edge corresponding to the received signal at the communications device based on the rising signal edge threshold involves comparing a positive peak signal amplitude corresponding to the received signal with the rising signal edge threshold and identifying the rising signal edge when the positive peak signal amplitude is greater than the rising signal edge threshold.

In an embodiment, the method further involves changing the rising signal edge threshold after the rising signal edge is detected.

In an embodiment, changing the rising signal edge threshold after the rising signal edge is detected involves changing the rising signal edge threshold based on a positive peak signal amplitude after the rising signal edge is detected.

In an embodiment, the method further involves combining the detected falling signal edge and the detected rising signal edge to generate an envelope signal.

In an embodiment, decoding the received signal based on the detected falling signal edge and the detected rising signal edge involves decoding the envelope signal to generate a plurality of decoded bits.

In an embodiment, the method further involves processing the received signal to generate a processed signal.

In an embodiment, detecting the falling signal edge corresponding to the received signal at the communications device based on the falling signal edge threshold involves comparing a peak signal amplitude of the processed signal with the falling signal edge threshold and identifying the falling signal edge when the peak signal amplitude is greater than the falling signal edge threshold.

In an embodiment, detecting the rising signal edge corresponding to the received signal at the communications device based on the rising signal edge threshold involves comparing a peak signal amplitude of the processed signal with the rising signal edge threshold and identifying the rising signal edge when the peak signal amplitude is greater than the rising signal edge threshold.

In an embodiment, the communications device is a near field communications (NFC) device.

In an embodiment, a communications device that communicates via inductive coupling includes a falling signal edge detector configured to detect a falling signal edge corresponding to a received signal at the communications device based on a falling signal edge threshold, a rising signal edge detector configured to detect a rising signal edge corresponding to the received signal based on a rising signal edge threshold, wherein the rising signal edge threshold is independent from the falling signal edge threshold, and a decoder configured to decode the received signal based on the detected falling signal edge and the detected rising signal edge.

In an embodiment, the falling signal edge detector is further configured to compare a negative peak signal amplitude corresponding to the received signal with the falling signal edge threshold and identify the falling signal edge when the negative peak signal amplitude is greater than the falling signal edge threshold.

In an embodiment, the falling signal edge detector is further configured to change the falling signal edge threshold after the falling signal edge is detected.

In an embodiment, the rising signal edge detector is further configured to compare a positive peak signal amplitude corresponding to the received signal with the rising signal edge threshold and identify the rising signal edge when the positive peak signal amplitude is greater than the rising signal edge threshold.

In an embodiment, the rising signal edge detector is further configured to change the rising signal edge threshold after the rising signal edge is detected.

In an embodiment, the communications device further includes a combiner configured to combine the detected falling signal edge and the detected rising signal edge to generate an envelope signal.

In an embodiment, a method for operating an NFC device involves detecting a falling signal edge corresponding to a received signal at the NFC device based on a falling signal edge threshold, detecting a rising signal edge corresponding to the received signal based on a rising signal edge threshold, wherein the rising signal edge threshold is independent from the falling signal edge threshold, combining the detected falling signal edge and the detected rising signal edge to generate an envelope signal, and decoding the envelope signal to generate a plurality of decoded bits.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
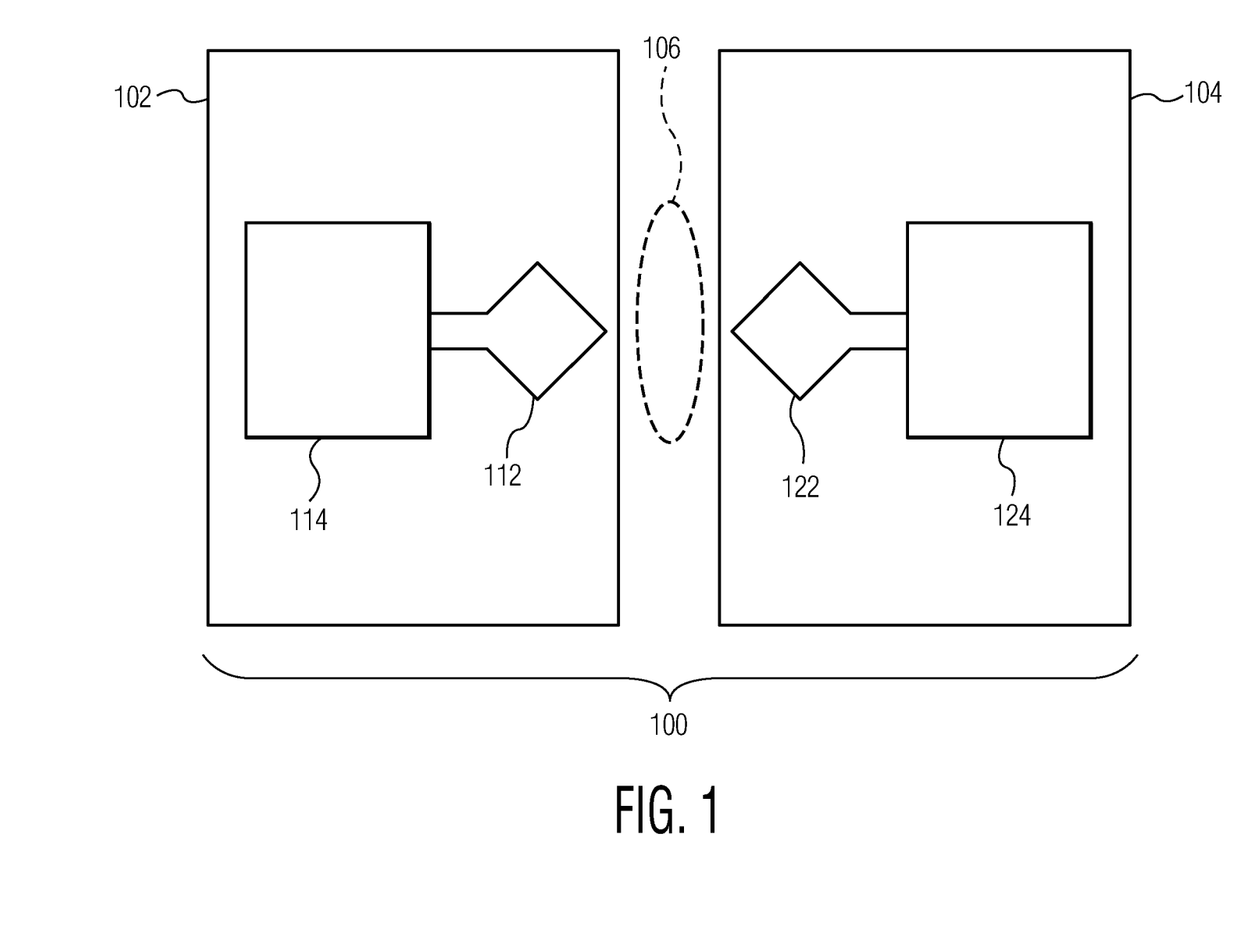
FIG. 1 depicts an embodiment of a communications device that can be used with a counterpart communications device to form an inductively coupled communications system.

FIG. 1 depicts an embodiment of a communications device 102 that can be used with a counterpart communications device 104 to form an inductively coupled communications system 100. In the inductively coupled communications system depicted in FIG. 1, the communications device 102 communicates with the counterpart communications device 104 via inductive coupling via a communications channel 106. In some embodiments, the communications device 102 is a card/transponder device or the communications device 102 is in a "card-mode" in which the communications device 102 behaves as a card/transponder device and the counterpart communications device 104 is a dedicated reader device or a communications device in "reader-mode" in which the counterpart communications device 104 behaves as a reader device. In some other embodiments, the communications device 102 is a reader device or the communications device is in a reader mode and the counterpart communications device 104 is a dedicated card device or a communications device in card-mode.

In the embodiment depicted in FIG. 1, the communications device 102 includes an antenna 112 and an RF transceiver 114 configured to receive incoming RF signals from the antenna and/or to transmit outgoing RF signals through the antenna. The antenna 112 is an induction type antenna such as a loop antenna or any other suitable type of induction type antenna. The communications device may be fully or partially implemented as an integrated circuit (IC) device. In some embodiments, the communications device is a handheld computing system or a mobile computing system, such as a mobile phone. The communications device may be an NFC device that utilizes inductive coupling to communicate. In some embodiments, the communications device is implemented as an RF transponder that is compatible with the International Organization for Standardization (ISO)/the International Electrotechnical Commission (IEC) 14443 standard that may operate at 13.56 MHz. Although the illustrated communications device is shown with certain components and described with certain functionality herein, other embodiments of the communications device 102 may include fewer or more components to implement the same, less, or more functionality.

In the embodiment depicted in FIG. 1, the counterpart communications device 104 includes an antenna 122 and an RF transceiver 124 configured to receive incoming RF signals from the antenna 122 and/or to transmit outgoing RF signals through the antenna 122. The antenna 122 is an induction type antenna such as a loop antenna or any other suitable type of induction type antenna. The counterpart communications device 104 may be fully or partially implemented as an integrated circuit (IC) device. In some embodiments, the counterpart communications device is a handheld computing system or a mobile computing system, such as a mobile phone. The counterpart communications device may be an NFC device that utilizes inductive coupling to communicate. In some embodiments, the counterpart communications device is implemented as an RF transponder that is compatible with the ISO/IEC 14443 standard. Although the illustrated counterpart communications device is shown with certain components and described with certain functionality herein, other embodiments of the counterpart communications device may include fewer or more components to implement the same, less, or more functionality.

In an example operation of the inductively coupled communications system 100, an RF signal is received by the antenna 112 of the communications device 102 via inductive coupling from the antenna 122 of the counterpart communications device 104 and is passed to the RF transceiver 114 of the communications device 102 to convert the RF signal into a digital signal, which can be further processed by a digital processor. A signal may be generated in response to the RF signal and is used to produce an outgoing RF signal at the RF transceiver 114, which may be transmitted to the counterpart communications device via inductive coupling using the antenna 112.

Figure 2:
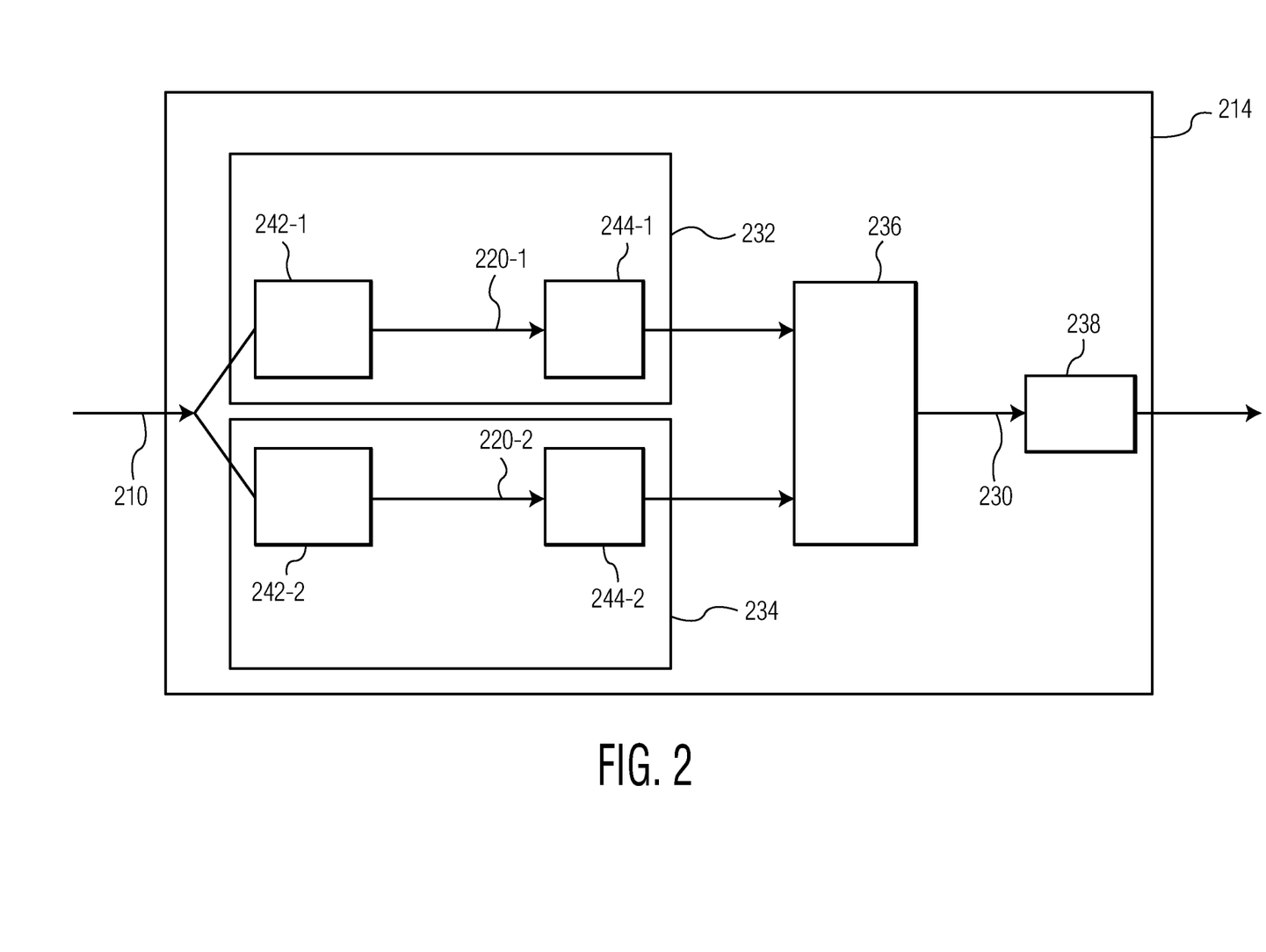
FIG. 2 depicts an embodiment of a receiver unit, which may be an embodiment of an RF transceiver of the communications device and/or an RF transceiver of the counterpart communications device depicted in FIG. 1.

FIG. 2 depicts a receiver unit 214 that is an embodiment of the RF transceiver 114 of the communications device 102 and/or the RF transceiver 124 of the counterpart communications device 104 depicted in FIG. 1. In the embodiment of FIG. 2, the receiver unit includes a falling signal edge detector 232, a rising signal edge detector 234, a combiner 236, and a decoder 238. Each of the falling signal edge detector, the rising signal edge detector, the combiner, and the decoder may be implemented as hardware, software, firmware, and/or a combination of hardware, software, and/or firmware. In some embodiments, at least one of the falling signal edge detector, the rising signal edge detector, the combiner, and the decoder is implemented as a processor such as a microcontroller or a central processing unit (CPU). The receiver unit depicted in FIG. 2 is a possible implementation of the RF transceiver 114 or 124 depicted in FIG. 1. However, the RF transceiver 114 or 124 depicted in FIG. 1 can be implemented differently from the receiver unit depicted in FIG. 2.

When characteristics of a communications channel vary over time (i.e., under a time-varying communications channel), a received signal at the communications device 102 or the counterpart communications device 104 may have varying amplitudes (e.g., overshoots and undershoots). Consequently, a corresponding waveform of the received signal may have an asymmetrical shape (e.g., with different slope and amplitude). Therefore, a falling signal edge corresponding to the received signal may have an amplitude that is different from the amplitude of a rising signal edge corresponding to the received signal. A receiver unit that uses a single signal edge threshold to detect both a falling signal edge and a rising signal edge may fail to detect either the falling signal edge or the rising signal edge when characteristics of a communications channel vary over time. In the embodiment of FIG. 2, the receiver unit 214 detects a falling signal edge and a rising signal edge corresponding to a received signal 210 based on independent falling signal edge and rising signal edge thresholds, respectively. The falling signal edge threshold is not dependent upon the rising signal edge threshold and vice versa. In some embodiments, the absolute value of the falling signal edge threshold is not equivalent to the absolute value of the rising signal edge threshold. In some embodiments, the rate of change of the falling signal edge threshold is different from the rate of change of the rising signal edge threshold. Because the receiver unit depicted in FIG. 2 performs the falling signal edge detection and the rising signal edge detection based on independent falling signal edge and rising signal edge thresholds, the receiver unit depicted in FIG. 2 detects a falling signal edge and a rising signal edge more accurately than a receiver unit that uses a single signal edge threshold to detect both a falling signal edge and a rising signal edge. Consequently, the performance, sensitivity, and robustness of the receiver unit depicted in FIG. 2 is better than the performance, sensitivity, and robustness of a receiver unit that uses a single signal edge threshold to detect both a falling signal edge and a rising signal edge.

In the embodiment of FIG. 2, the falling signal edge detector 232 is configured to detect a falling signal edge corresponding to the received signal 210 based on a falling signal edge threshold. In some embodiments, the received signal 210 is a signal that is transmitted from the antenna 112 to the RF transceiver 114 or a signal that is transmitted from the antenna 122 to the RF transceiver 124. In some embodiments, the falling signal edge detector is further configured to compare a negative peak signal amplitude corresponding to the received signal with the falling signal edge threshold and to identify the falling signal edge when the negative peak signal amplitude is greater than the falling signal edge threshold. In some embodiments, the falling signal edge detector is further configured to change the falling signal edge threshold after the falling signal edge is detected.

In the embodiment of FIG. 2, the falling signal edge detector 232 includes a first matched filter 242-1 and a first slicer 244-1. The first matched filter is configured to process the received signal 210 to generate a first processed signal 220-1. In some embodiments, the first matched filter is configured to process the received signal to generate a first derivative of the received signal. For example, the first matched filter matches the received signal to an ideal signal edge ( . . . 1, 1, 1, 1, −1, −1, −1, −1 . . . , where the amount of 1 s and −1 s are identical) and the output of the first matched filter is mathematically identical to the first derivative of the received signal. The first slicer is configured to detect a falling signal edge of the first processed signal based on the falling signal edge threshold. As is known in the art, the first slicer slices the first processed signal into two parts, which form the logical representations of true and false, by comparing the first processed signal with the specific falling signal edge threshold. In some embodiments, the first slicer is configured to compare a peak signal amplitude of the first processed signal with the falling signal edge threshold and to identify the falling signal edge when the peak signal amplitude is greater than the falling signal edge threshold. In some embodiments, the first slicer is configured to change the falling signal edge threshold after the falling signal edge is detected. In an embodiment, the first slicer is configured to change the falling signal edge threshold based on the negative peak signal amplitude after the falling signal edge is detected.

In the embodiment of FIG. 2, the rising signal edge detector 234 is configured to detect a rising signal edge corresponding to the received signal 210 based on a rising signal edge threshold that is independent from the falling signal edge threshold. In some embodiments, the received signal 210 is a signal that is transmitted from the antenna 112 to the RF transceiver 114 or a signal that is transmitted from the antenna 122 to the RF transceiver 124. Because the rising signal edge threshold is independent from the falling signal edge threshold, the rising signal edge detection can be independent from the falling signal edge detection. Consequently, each of the rising signal edge threshold and the falling signal edge threshold can be set individually for better detection accuracy. In some embodiments, the rising signal edge detector is further configured to compare a positive peak signal amplitude corresponding to the received signal with the rising signal edge threshold and identify the rising signal edge when the positive peak signal amplitude is greater than the rising signal edge threshold. In some embodiments, the positive peak amplitude is the magnitude of a crest in the positive side of a cycle. In some embodiments, the rising signal edge detector is further configured to change the rising signal edge threshold after the rising signal edge is detected.

In the embodiment of FIG. 2, the rising signal edge detector 234 includes a second matched filter 242-2 and a second slicer 244-2. The second matched filter is configured to process the received signal 210 to generate a second processed signal 220-2. In some embodiments, the second matched filter is configured to process the received signal to generate a first derivative of the received signal. For example, the second matched filter matches the received signal to an ideal signal edge ( . . . 1, 1, 1, 1, −1, −1, −1, −1 . . . , where the amount of 1 s and −1 s are identical) and the output of the second matched filter is mathematically identical to the first derivative of the received signal. The second slicer is configured to detect a rising signal edge of the second processed signal based on the rising signal edge threshold. As is known in the art, the second slicer slices the second processed signal into two parts, which form the logical representations of true and false, by comparing the second processed signal with the specific rising signal edge threshold. In some embodiments, the second slicer is configured to compare negative peak signal amplitude of the second processed signal with the rising signal edge threshold and to identify the rising signal edge when the negative peak signal amplitude is greater than the rising signal edge threshold. In some embodiments, the negative peak amplitude is the magnitude of a trough in the negative side of a cycle. In some embodiments, the second slicer is configured to change the rising signal edge threshold after the rising signal edge is detected. In an embodiment, the second slicer is configured to change the rising signal edge threshold based on the negative peak signal amplitude after the rising signal edge is detected.

In some embodiments, the falling signal edge threshold and the rising signal edge threshold are adjusted independently from each other. For example, the rising signal edge threshold is adjusted based on changes in positive peak signal amplitude while the falling signal edge threshold is adjusted based on changes in negative peak signal amplitude. Consequently, the receiver unit 214 depicted in FIG. 2 detects falling and rising signal edges more accurately than a receiver unit that uses a single signal edge threshold to detect both a falling signal edge and a rising signal edge.

In the embodiment of FIG. 2, the combiner 236 is configured to combine the detected falling signal edge from the rising signal edge detector 234 and the detected rising signal edge from the rising signal edge detector to generate an envelope signal 230. The combiner may be implemented with one or more suitable digital logic circuits. In some embodiments, the combiner is implemented using an adder logic.

In the embodiment of FIG. 2, the decoder 238 is configured to decode the received signal 210 into decoded bits based on the detected falling signal edge and the detected rising signal edge. In some embodiments, the decoder is configured to decode the envelope signal 230 that is generated by the combiner 236 to generate the decoded bits.

Figure 3:
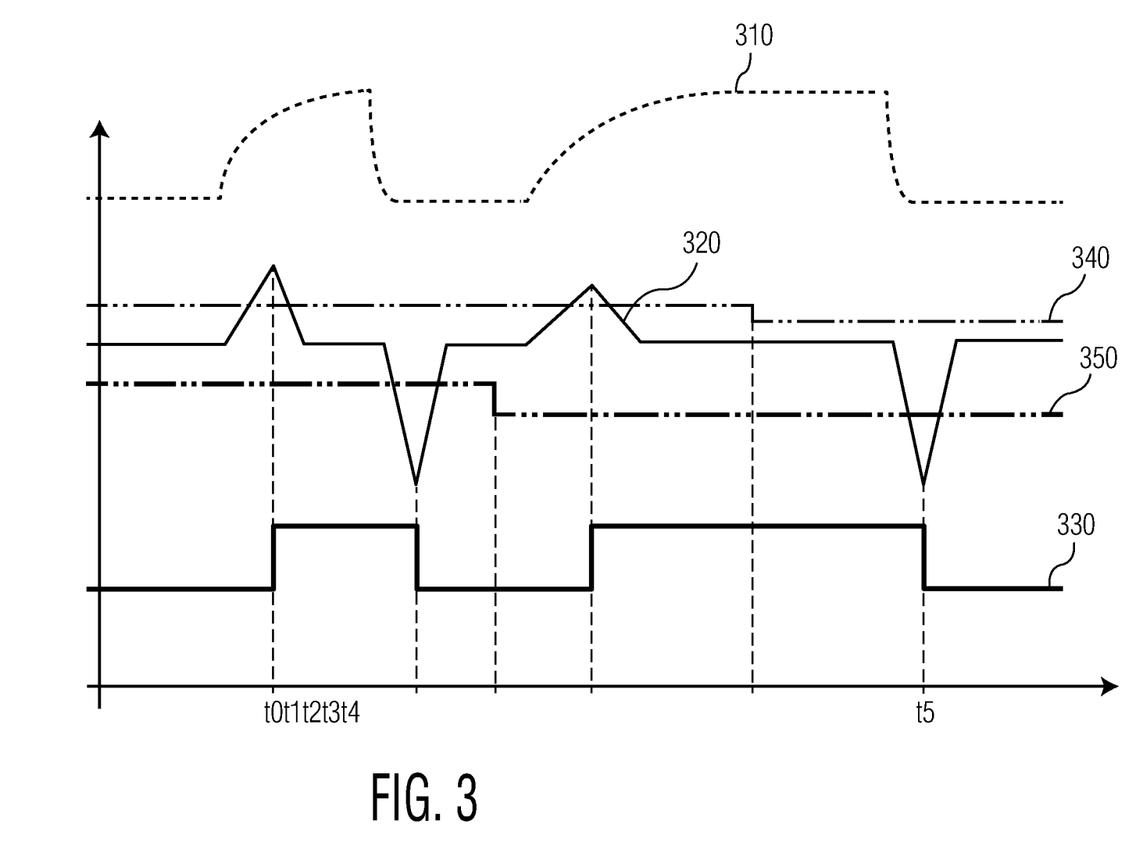
FIG. 3 depicts a signal timing diagram of the receiver unit depicted in FIG. 2.

FIG. 3 depicts a signal timing diagram of the receiver unit 214 depicted in FIG. 2. In the signal timing diagram illustrated in FIG. 3, a received signal 310 at the receiver unit, a first derivative 320 of the received signal that is generated by the first matched filter 242-1 or the second matched filter 242-2, an envelope signal 330 that is generated by the combiner 236 based on detected falling and rising signal edges, a rising signal edge threshold 340, and a falling signal edge threshold 350 are shown. At time point, t0, a positive peak signal amplitude of the first derivative is higher than the rising signal edge threshold, and consequently, a rising signal edge is detected. At time point, t1, a negative peak signal amplitude of the first derivative is higher than the falling signal edge threshold, and consequently, a falling signal edge is detected. At time point, t2, the falling signal edge threshold is adjusted, for example, based on the previous negative peak signal amplitude and an adjust factor. At time point, t3, another positive peak signal amplitude of the first derivative is higher than the rising signal edge threshold, and consequently, another rising signal edge is detected. At time point, t4, the rising signal edge threshold is adjusted, for example, based on the previous positive peak signal amplitude and an adjust factor. At time point, t5, another negative peak signal amplitude of the first derivative is higher than the falling signal edge threshold, and consequently, another falling signal edge is detected. A receiver unit that uses a single signal edge threshold to detect both a falling signal edge and a rising signal edge may fail to detect a rising signal edge when a positive peak signal amplitude is smaller than a negative peak signal amplitude (e.g., in cases where the positive peak signal amplitude of the first derivative is smaller than the negative peak signal amplitude of the first derivative). However, the receiver unit 214 depicted in FIG. 2 uses the falling signal edge threshold to detect a falling signal edge and the rising signal edge threshold that is independent from the falling signal edge threshold to detect a rising signal edge. Consequently, the receiver unit depicted in FIG. 2 detects falling and rising signal edges more accurately than a receiver unit that uses a single signal edge threshold to detect both a falling signal edge and a rising signal edge. In addition, the receiver unit depicted in FIG. 2 adjusts the falling signal edge threshold and the rising signal edge threshold independently from each other. For example, the rising signal edge threshold is adjusted based on changes of the positive peak signal amplitude of the first derivative while the falling signal edge threshold is adjusted based on changes of the negative peak signal amplitude of the first derivative. Consequently, the receiver unit depicted in FIG. 2 detects a falling signal edge and a rising signal edge more accurately than a receiver unit that uses a single signal edge threshold to detect both a falling signal edge and a rising signal edge.

Figure 4:
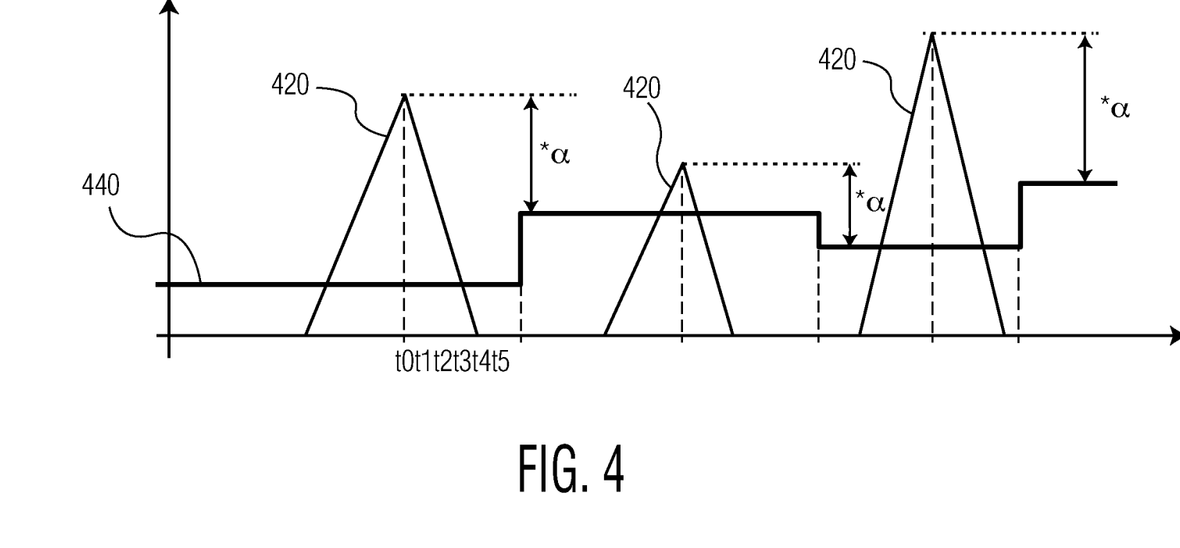
FIG. 4 depicts another signal timing diagram of the receiver unit depicted in FIG. 2.

FIG. 4 depicts another signal timing diagram of the receiver unit 214 depicted in FIG. 2. In the signal timing diagram illustrated in FIG. 4, a positive amplitude value component of a first derivative 420 of the received signal that is generated by the second matched filter 242-2 and a rising signal edge threshold 440 are shown. At time point, t0, a positive peak signal amplitude of the first derivative is higher than the rising signal edge threshold, and consequently, a rising signal edge is detected. At time point, t1, the rising signal edge threshold is increased, for example, based on the previous positive peak signal amplitude and an adjust factor, α. In some embodiments, the adjusted rising signal edge threshold can be expressed as:

$$TH_{Adjusted} = (1-\alpha) \times PPA_{Previous}, \quad (1)$$

where $TH_{Adjusted}$ represents the adjusted rising signal edge threshold, $TH_{Previous}$ represents the previous rising signal edge threshold, and $PPA_{Previous}$ represents the previous positive peak signal amplitude. In some embodiments, the adjust factor, α, is between 0.25 and 0.75. At time point, t2, another positive peak signal amplitude of the first derivative is higher than the rising signal edge threshold, and consequently, another rising signal edge is detected. At time point, t3, the rising signal edge threshold is reduced because the current peak positive peak signal amplitude is lower than the previously positive peak signal amplitude. The rising signal edge threshold may be reduced based on the previous positive peak signal amplitude and the adjust factor, α, for example, based on equation (1). At time point, t4, another positive peak signal amplitude of the first derivative is higher than the rising signal edge threshold, and consequently, another rising signal edge is detected. At time point, t5, the rising signal edge threshold is increased (e.g., based on equation (1)) because the current peak positive peak signal amplitude is higher than the previously positive peak signal amplitude. The rising signal edge threshold may be increased based on the previous positive peak signal amplitude and the adjust factor, α.

Figure 5:
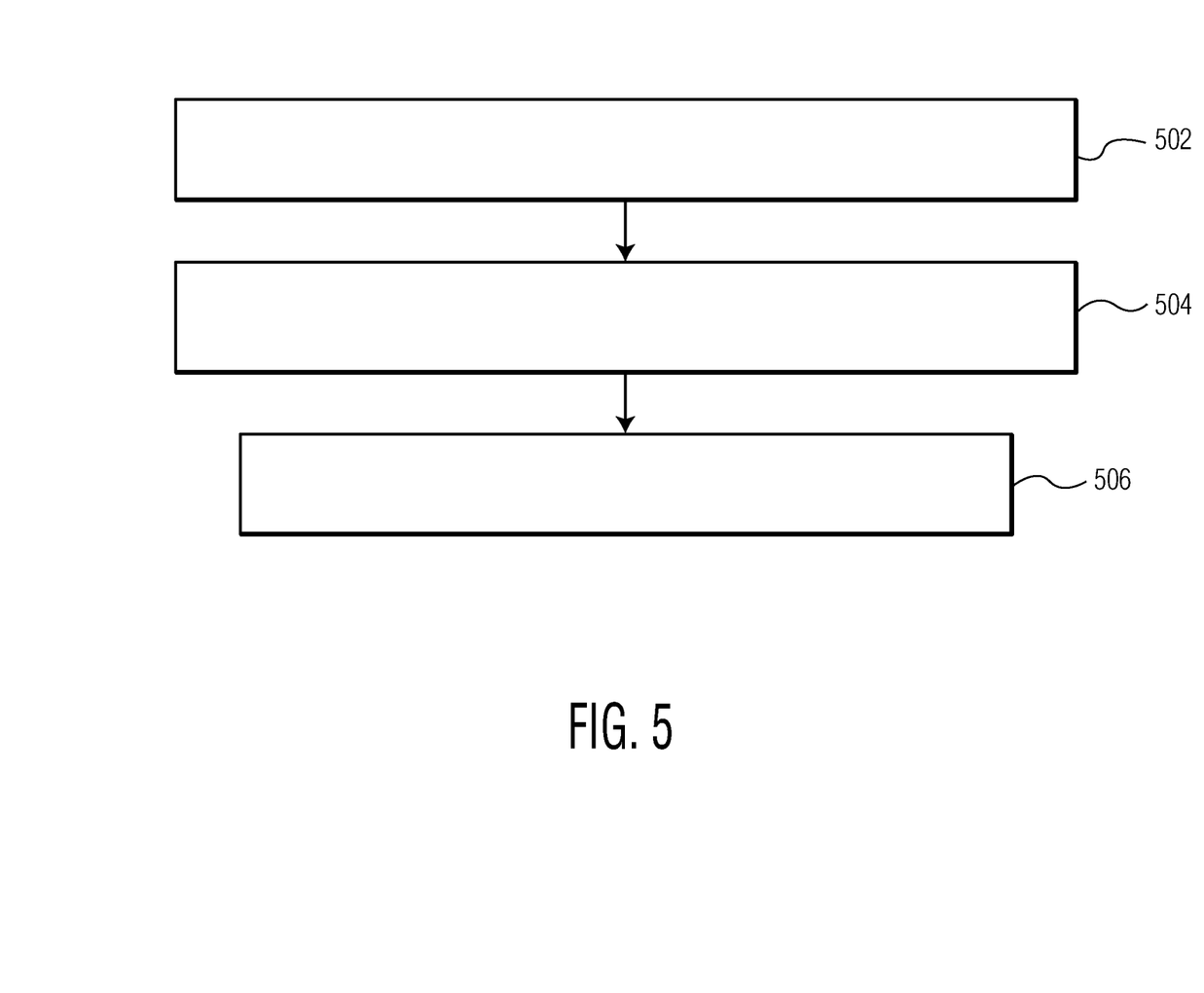
FIG. 5 is a process flow diagram of a method for operating a communications device that communicates via inductive coupling in accordance with an embodiment of the invention.

FIG. 5 is a process flow diagram of a method for operating a communications device that communicates via inductive coupling in accordance with another embodiment of the invention. At block 502, a falling signal edge corresponding to a received signal at the communications device is detected based on a falling signal edge threshold. At block 504, a rising signal edge corresponding to the received signal is detected based on a rising signal edge threshold, where the rising signal edge threshold is independent from the falling signal edge threshold. At block 506, the received signal is decoded based on the detected falling signal edge and the detected rising signal edge. The communications device may be the same or similar to the communications device 102 and/or the counterpart communications device 104 depicted in FIG. 1.

Figure 6:
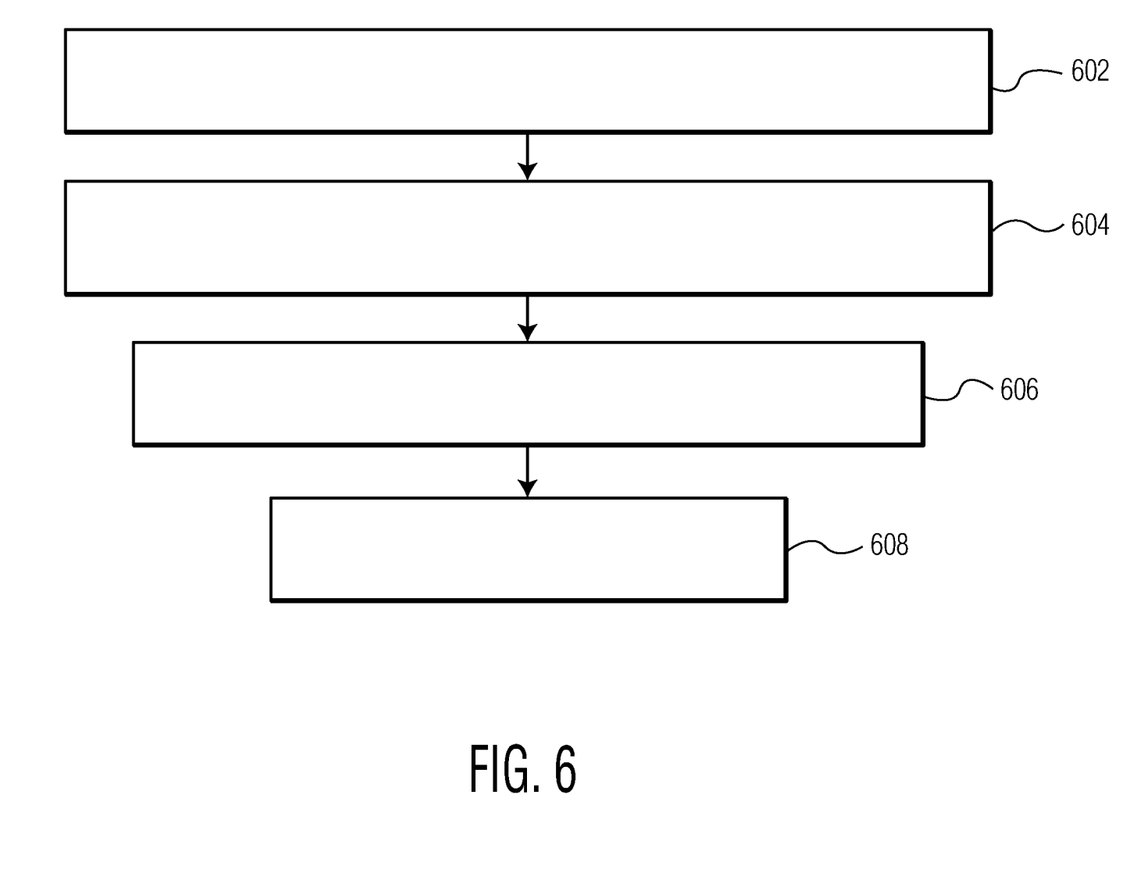
FIG. 6 is a process flow diagram of a method for operating an NFC device in accordance with another embodiment of the invention.

FIG. 6 is a process flow diagram of a method for operating an NFC device in accordance with another embodiment of the invention. At block 602, a falling signal edge corresponding to a received signal at the NFC device is detected based on a falling signal edge threshold. At block 604, a rising signal edge corresponding to the received signal is detected based on a rising signal edge threshold, where the rising signal edge threshold is independent from the falling signal edge threshold. At block 606, the detected falling signal edge and the detected rising signal edge are combined to generate an envelope signal. At block 608, the envelope signal is decoded to generate decoded bits. The NFC device may be the same or similar to the communications device 102 and/or the counterpart communications device 104 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semi-conductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method for operating a communications device that communicates via inductive coupling, the method comprising:
   detecting a falling signal edge corresponding to a received signal at the communications device based on a falling signal edge threshold;
   detecting a rising signal edge corresponding to the received signal based on a rising signal edge threshold, wherein the rising signal edge threshold is independent from the falling signal edge threshold; and
   decoding the received signal based on the detected falling signal edge and the detected rising signal edge, wherein the received signal is processed by a first matched filter to generate a first processed signal and the falling signal edge is detected in the first processed signal by a first slicer based on the falling signal edge threshold, and wherein the received signal is processed by a second matched filter to generate a second processed signal and the rising signal edge is detected in the second processed signal by a second slicer based on the rising signal edge threshold.

2. The method of claim 1, wherein detecting the falling signal edge corresponding to the received signal at the communications device based on the falling signal edge threshold comprises:

comparing a negative peak signal amplitude corresponding to the received signal with the falling signal edge threshold; and identifying the falling signal edge when the negative peak signal amplitude is greater than the falling signal edge threshold.

3. The method of claim 1, further comprising changing the falling signal edge threshold after the falling signal edge is detected.

4. The method of claim 3, wherein changing the falling signal edge threshold after the falling signal edge is detected comprises changing the falling signal edge threshold based on a negative peak signal amplitude after the falling signal edge is detected.

5. The method of claim 1, wherein detecting the rising signal edge corresponding to the received signal at the communications device based on the rising signal edge threshold comprises:

comparing a positive peak signal amplitude corresponding to the received signal with the rising signal edge threshold; and identifying the rising signal edge when the positive peak signal amplitude is greater than the rising signal edge threshold.

6. The method of claim 1, further comprising changing the rising signal edge threshold after the rising signal edge is detected.

7. The method of claim 6, wherein changing the rising signal edge threshold after the rising signal edge is detected comprises changing the rising signal edge threshold based on a positive peak signal amplitude after the rising signal edge is detected.

8. The method of claim 1, further comprising combining the detected falling signal edge and the detected rising signal edge to generate an envelope signal.

9. A communications device that communicates via inductive coupling, the communications device comprising:

a falling signal edge detector configured to detect a falling signal edge corresponding to a received signal at the communications device based on a falling signal edge threshold;

a rising signal edge detector configured to detect a rising signal edge corresponding to the received signal based on a rising signal edge threshold, wherein the rising signal edge threshold is independent from the falling signal edge threshold; and a decoder configured to decode the received signal based on the detected falling signal edge and the detected rising signal edge, wherein the received signal is processed by a first matched filter to generate a first processed signal and the falling signal edge is detected in the first processed signal by a first slicer based on the falling signal edge threshold, and wherein the received signal is processed by a second matched filter to generate a second processed signal and the rising signal edge is detected in the second processed signal by a second slicer based on the rising signal edge threshold.

10. The communications device of claim 9, wherein the falling signal edge detector is further configured to:

compare a negative peak signal amplitude corresponding to the received signal with the falling signal edge threshold; and identify the falling signal edge when the negative peak signal amplitude is greater than the falling signal edge threshold.

11. The communications device of claim 9, wherein the falling signal edge detector is further configured to change the falling signal edge threshold after the falling signal edge is detected.

12. The communications device of claim 11, wherein the falling signal edge detector is further configured to change the falling signal edge threshold based on a negative peak signal amplitude after the falling signal edge is detected.

13. The communications device of claim 9, wherein the rising signal edge detector is further configured to:

compare a positive peak signal amplitude corresponding to the received signal with the rising signal edge threshold; and identify the rising signal edge when the positive peak signal amplitude is greater than the rising signal edge threshold.

14. The communications device of claim 9, wherein the rising signal edge detector is further configured to change the rising signal edge threshold after the rising signal edge is detected.

15. The communications device of claim 9, further comprising a combiner configured to combine the detected falling signal edge and the detected rising signal edge to generate an envelope signal.

* * * * *